July 26, 1949. H. R. DYSON 2,477,050
SUBMARINE ATTACKING DEVICE
Filed March 6, 1946 3 Sheets-Sheet 1
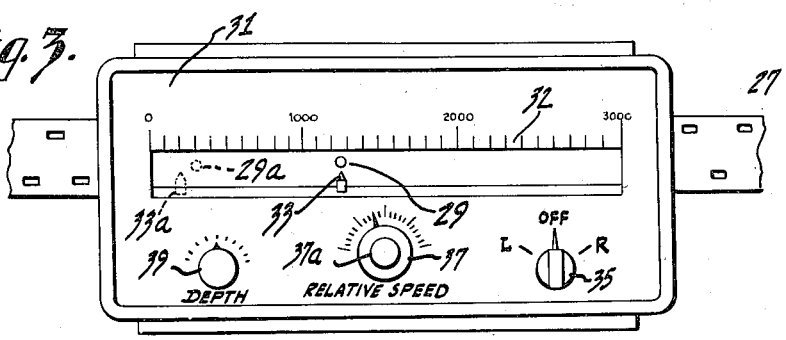
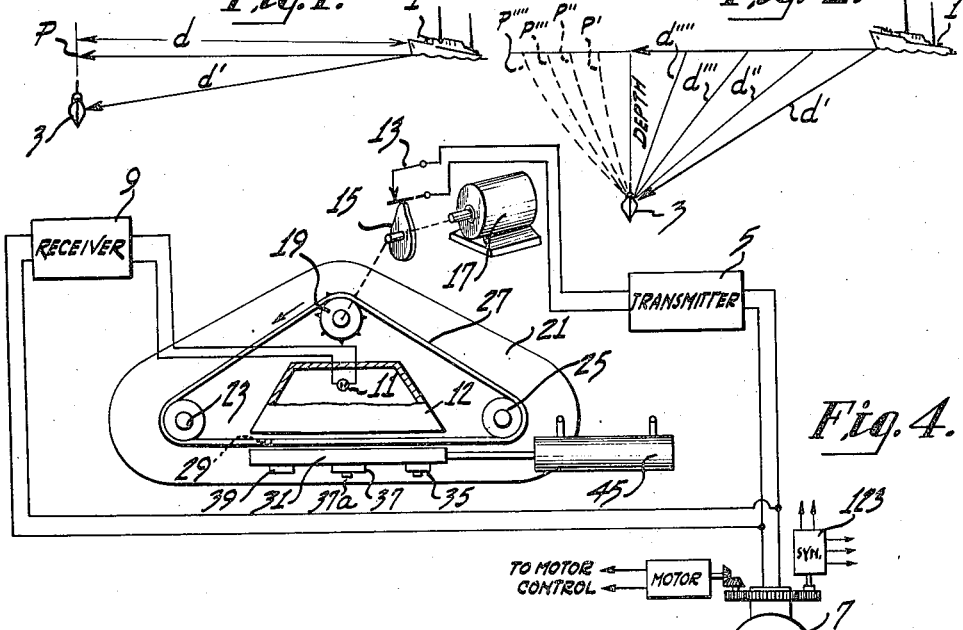
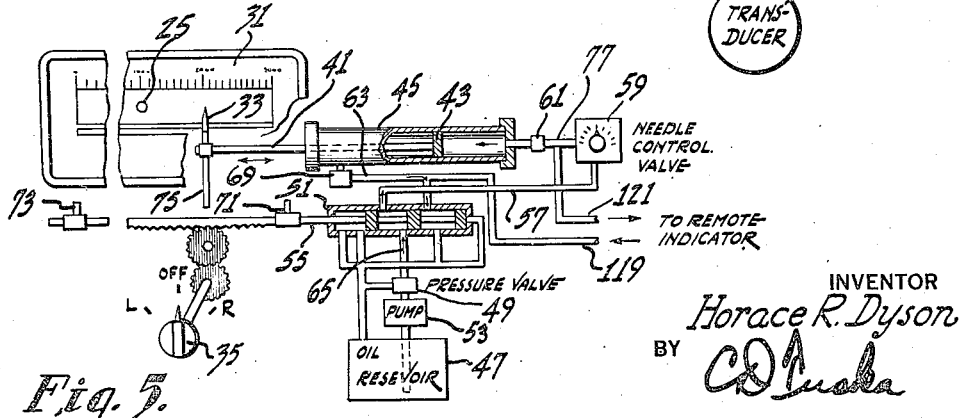
INVENTOR
Horace R. Dyson
BY
ATTORNEY

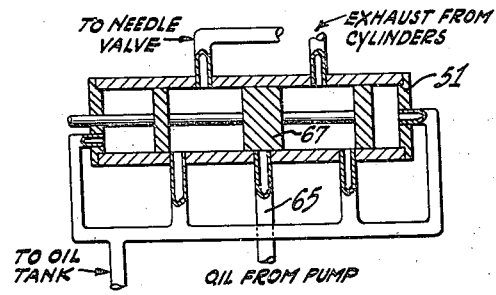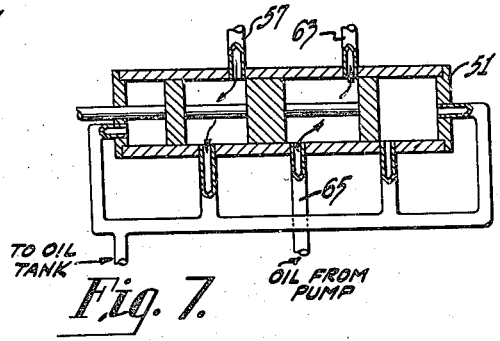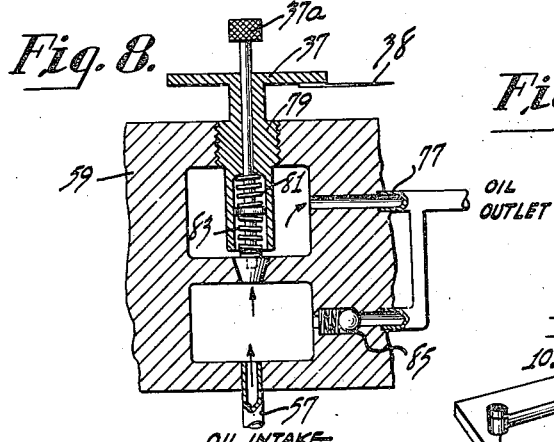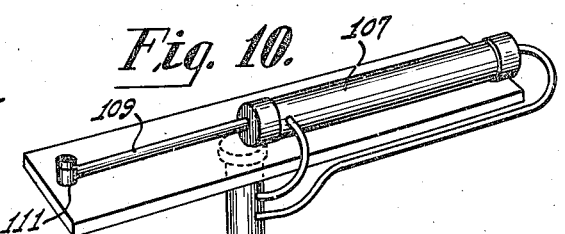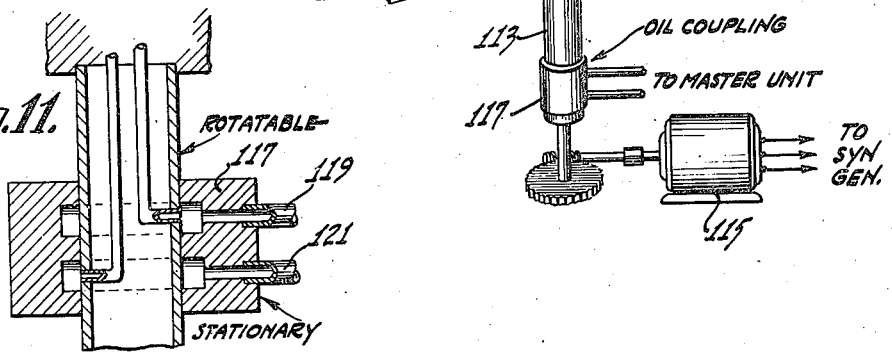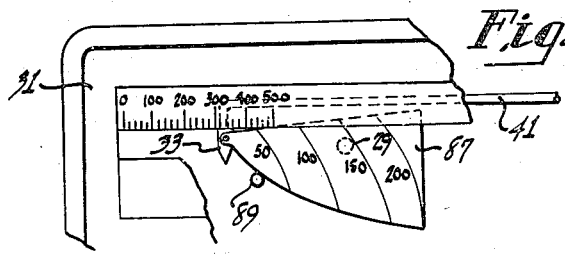

July 26, 1949.   H. R. DYSON   2,477,050
SUBMARINE ATTACKING DEVICE

Filed March 6, 1946   3 Sheets-Sheet 3

INVENTOR.
Horace R. Dyson
BY
ATTORNEY

Patented July 26, 1949

2,477,050

UNITED STATES PATENT OFFICE 2,477,050

SUBMARINE ATTACKING DEVICE

Horace R. Dyson, Haddonfield, N. J., assignor to Radio Corporation of America, a corporation of Delaware Application March 6, 1946, Serial No. 652,473

7 Claims. (Cl. 235—61.5)

This invention relates to submarine attacking devices, and more particularly to an underwater range finder for use on shipboard to provide information as to the position of a ship with respect to a submerged submarine for the purpose of indicating the proper time for the release of depth charges.

Underwater signalling systems are known in which short pulses of energy, preferably above the normal frequency of sound, are radiated directionally by an electromechanical transducer, the reflected pulse being used to determine the bearing and distance of an object. However, such systems do not fully meet the needs of ship commanders due to the fact that the straight line distance between the ship and the submarine does not indicate the proper firing position for dropping depth charges, even where the bearing of the submarine is known. The proper firing position is determined by the position of the ship with respect to a point on the surface of the water directly above the submarine. If the depth of the submarine under the surface is also known, the position of the ship on the surface of the water with respect to the submarine can be calculated. Conventional underwater signalling systems, however, do not provide a direct depth indication, nor is it practical to modify such systems to do so, as, for example, by tilting the projector in a vertical plane, since such an arrangement involves a complicated and massive control system which is not desirable.

It is therefore the primary purpose of this invention to provide a method of and means for establishing the distance of a ship from a point on the surface of the water directly over a submarine, hereinafter called the horizontal or running distance, and in addition, an accurate estimate of the time when the ship will be in a predetermined position, as well as the depth and bearing of the submarine. In brief, this is accomplished in accordance with the present invention by determining the straight line distance, utilizing a conventional pulse echo system, determining the rate of change of that distance in the early stages of the attack when the ship is running down the target at a constant speed and using this information to set in motion a horizontal distance or running range indicator which thereafter moves at a constant speed and which provides the desired information.

A further object of this invention is to provide an improved range and depth indicator. A still further object of this invention is to provide means for indicating the horizontal distance between a ship and a submerged submarine. The novel features that are considered characteristic of this invention are set forth with particularity in the appended claims. The invention itself, both as to its organization and method of operation as well as additional objects and advantages thereof, will best be understood from the following description when read in connection with the accompanying drawings, in which Figures 1 and 2 are typical distance-depth triangles useful in illustrating the invention;

Figure 3 is a view of an indicator embodying this invention;

Figure 4 is a schematic drawing illustrating a typical pulse type underwater signalling distance indicator;

Figure 5 is a schematic drawing illustrating the method of combining the running range indicator of this invention with the distance indicator of the prior art;

Figures 6 and 7 illustrate two positions of a hydraulic valve used in the present invention;

Figure 8 is a cross-sectional drawing of a needle control valve;

Figure 9 illustrates the method of employing the principle of this invention with a circular scale;

Figure 10 is a perspective view of a device providing an indication of an angular bearing as well as running distance;

Figure 11 is a hydraulic coupling used in connection with the device illustrated in Fig. 10;

Figure 13 is a detail showing an arrangement for indicating depth.

Similar elements in the drawings will be indicated by similar reference numerals.

Figure 12:
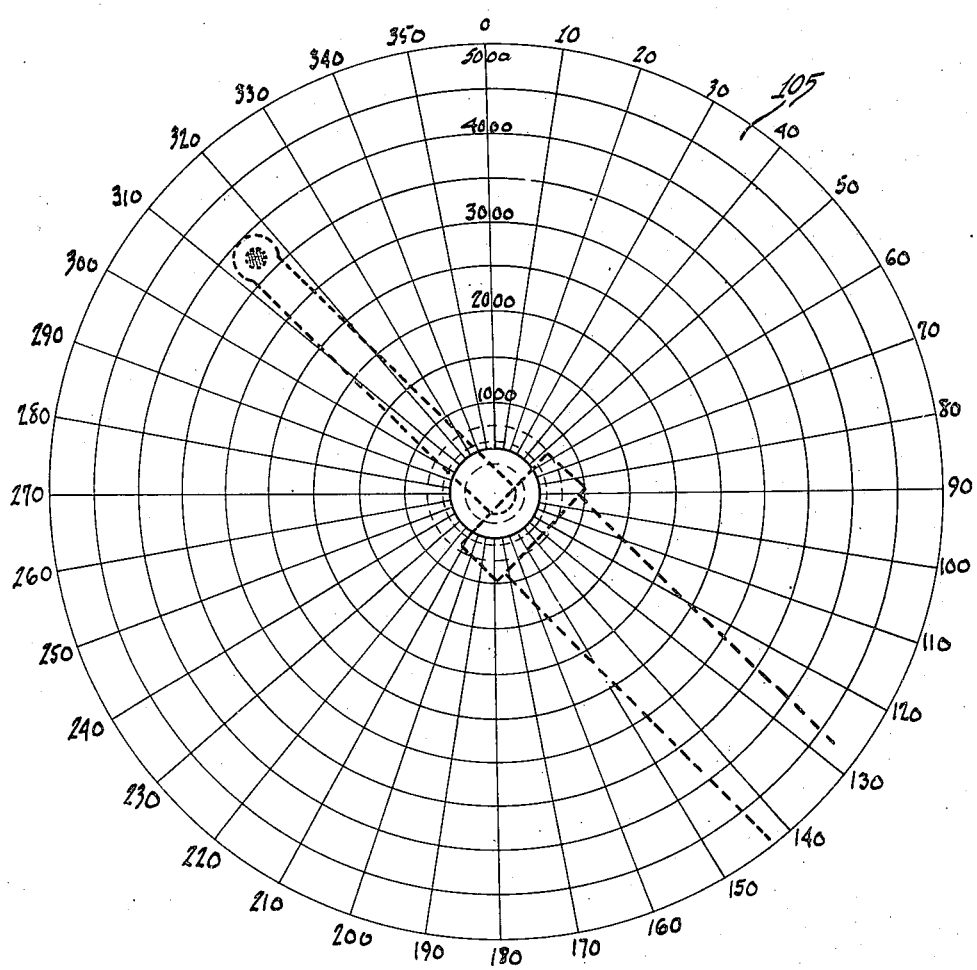
Figure 12 illustrates a mooring board or chart used in one embodiment of this invention.

Referring to Fig. 1, a ship 1 is illustrated at the beginning of its attack on a submerged submarine 3. It is assumed that the bearing of the submarine has been determined and the ship is closing in on the submarine and is proceeding directly toward it at a constant speed. It will be appreciated that when the straight-line distance $d'$ between the ship and the submarine is relatively great, for example, three to four thousand yards, this distance will be approximately equal to the horizontal distance $d$ which is measured between the ship and a point P on the surface of the water directly above the submarine. Thus, in the early stages of the attack, the location of the point P can be ascertained with reasonable accuracy by assuming the two distances $d$ and $d'$ to be equal. However, as the distance $d'$ is decreased, the error of this assumption becomes increasingly great. This is illustrated in Fig. 2 in which successive straight-line distances $d'$, $d''$, $d'''$ and $d''''$ have been indicated for a typical situation, the error being illustrated by rotating the straight-line distance into the horizontal plane to produce corresponding points $P'$, $P''$, $P'''$, $P''''$. It may therefore be seen that, in the absence of an accurate indication of the depth of the submarine, the proper position for dropping a depth charge cannot be determined solely from a knowledge of the straight-line distance.

In accordance with the present invention, a pulse type echo range finder provided with a linear range scale is employed to provide the basic information which is automatically and mechanically converted into the desired information for the purpose of determining the depth and horizontal distance of the submarine. Referring to Figs. 3 and 4, a pulse type range indicator is illustrated of the type shown in Patent 2,355,502 for a Signal indicator and recorder, issued on August 8, 1944, to L. E. Barton. A pulse transmitter 5 is connected to a magneto-strictive or equivalent transducer 7, which is employed in accordance with conventional practice both for transmission of the radiated pulse and reception of the echo signal. Thus, the input of a receiver 9 is also connected to the transducer 7. The output of the receiver is applied to a neon or similar gaseous discharge lamp 11 in a lamp housing 12. The transmitter 5 is keyed by a switch 13 operated by a cam 15 which is driven by a motor 17. The motor also drives a sprocket 19 which is mounted on a base plate 21. Two idler rollers 23 and 25 are likewise mounted on base plate 21 and carry a flexible opaque belt 27 which is caused to rotate by the motor. The belt 27 is provided with one or more apertures 29 through which the light produced by lamp 11 may be observed. In front of the belt and adjacent a straight section thereof a dial face 31 is arranged having a rectangular opening therein through which the lighted aperture 29 may be observed. A corresponding opening is provided in the opposed face of the lamp housing 12. The length of the rectangular opening is calibrated in yards by a range scale 32. The portion of the device so far described is that claimed in the Barton patent referred to above. In brief, its operation is as follows: The length of the belt and the number and position of the apertures 29 are synchronized with the transmitter keying so that a pulse is transmitted each time an aperture 29 passes the zero mark on scale 32. The speed is such that the aperture traverses the range scale in a time corresponding to the echo return from a distance equal to the maximum range indicated. The transmitted pulse which is applied to the receiver causes the lamp 11 to light instantaneously, and an apparently stationary spot of light may be observed at the zero position. By the time the reflected echo has been received, the aperture 29 has moved to the right a distance which corresponds to the time interval between the transmission of the pulse and reception of the echo, and is thus proportional to the straight line distance to the reflecting object. The echo again causes the lamp 11 to be illuminated instantaneously and a second spot of light, apparently stationary, is observed. Consequently the position of the visible indication produced by the light shining through aperture 29 is a measure of the straight line distance to the reflecting object.

In accordance with the present invention, there is associated with the dial 31 an indicator 33 whose position may be rapidly adjusted by means of a manual control knob 35 and whose speed may be controlled by a manually operated needle valve control 37, in a manner which will be hereinafter described. A control knob 39 is also mounted on the dial 31 by means of which the operator may transmit intelligence to a remote point indicative of the depth of the submarine, as will be described subsequently.

Referring now to Fig. 5, a hydraulically operated mechanism is illustrated which will cause the indicator 33 to move at the desired speed and by means of which the necessary adjustment and control can be effected. Indicator 33 is mounted at the end of a shaft 41 which is driven to the right or to the left, as may be desired, by a piston 43 contained within a cylinder 45. The piston is hydraulically operated, for example, by a fluid such as oil, which is contained in a reservoir 47 and circulated to the cylinder through a pressure valve 49 and a reversing valve 51 by means of a pump 53. Reversing valve 51 has three positions of operation according to the position of a shaft 55. In the position illustrated, the oil will flow from the pump through the left hand valve chamber and out through a pipe 57 to a needle control valve 59, and then into the right hand portion of cylinder 45 through a compensating valve 61. This will cause the piston 43 to be moved to the left, the exhaust oil flowing out through the exhaust pipe 63, the right hand chamber of the reversing valve 51 and back to the oil reservoir. The second or "off" position of the reversing valve 51 is illustrated in Fig. 6. It will be observed that the input pipe 65 from the oil pump is blocked by cylinder 67, thus holding the piston 43 and the indicator 33 in a fixed position. The third position of the reversing valve 51 is illustrated in Fig. 7. In this case the oil flows through the right hand chamber of the reversing valve, out pipe 63, through a compensating valve 69, and to the left hand portion of the cylinder 45. The oil from the right hand portion of the cylinder is now exhausted through pipe 57, the left hand chamber of the reversing valve and thus to the oil reservoir.

Referring again to Fig. 5, the control shaft 55 is provided with stops 71 and 73 positioned approximately at the two ends of the dial scale. The indicator shaft 41 is provided with a valve operating member 75 which engages stops 71 and 73 at the extreme limits of its movement and which operate the valve so as to shut off the oil flow and stop the movement of the indicator. Control knob 35 is geared to the valve shaft 55, thus permitting the operator to set the valve at any one of its three positions and thus to control the movement of the indicator at will.

The construction of the needle control valve 59 is shown in detail at Fig. 8, to which reference is now made. The oil feed pipe 57 terminates in a needle valve which permits the flow of a desired quantity of fluid to the output pipe 77. The needle valve itself may be operated either by turning knob 37, which provides a fine adjustment of the position of the needle valve by means of a threaded section 79, or by operating the course control knob 37a. This knob is movable in or out with respect to the fine adjusting knob 37 against the balanced tension of a pair of springs 81, 83 which support the needle valve. The valve may therefore be rapidly opened or closed by pushing or pulling on knob 37a to permit the rapid positional adjustment of the indicator 33 without disturbing the normal adjustment of the needle valve as determined by the position of knob 37. The latter is provided with a pointer 38 which cooperates with a calibrated scale. A unidirectional release valve 85 is connected between the intake and outlet pipes for the purpose of by-passing the needle valve when the direction of the oilflow is reversed. This will permit the rapid return of the indicator 33 to its starting position without upsetting the adjustment of the needle valve.

Returning again to consideration of Fig. 5, it will be noted that a pair of compensating valves 61 and 69 have been included between the cylinder 45 and the reversing valve 51, and that connections have been provided for transmitting the hydraulic fluid to a remote indicator. The details of the remote indicator will be described subsequently. The purpose of the compensating valves is to provide means for bringing the remote indicator into agreement with the master unit so that the two may be in positional agreement at all times. Since the pipes connecting the remote unit will have a certain additional resistance to the flow of the hydraulic fluid, which would tend to cause more fluid to flow through the system having the lower resistance, the compensating valves provide such additional resistance as is required to equalize the flow to the two indicators. Pressure valve 49 is merely a relief outlet for the pump which will operate when the reversing valve is in the off position and will return oil to the oil reservoir when the pressure exceeds a predetermined value.

In utilizing the device described above to determine the position of a ship with respect to a point on the surface of the water above a submerged submarine, the ship is first directed towards the submarine at a constant speed. The straight line distance to the submarine may then be determined by the position of the indicator or spot 29 with respect to the calibrated distance scale 32. The rate of change of this distance may be determined by observing the rate of change of the spot with respect to the scale.

The position of the indicator 33 is then brought into positional alignment with spot 29 by manipulating the reversing valve 35, moving the indicator 33 to the right or left as necessary. The reversing switch 35 is then placed in the "left" position and the hydraulic system will cause the pointer to move at a constant speed to the left, that is, toward the zero range position. The speed of this movement is adjusted by the needle valve controls 37 and 37a until the indicator is moving at the same rate as, and is aligned with, the spot 29. As pointed out above, when the distance to the submarine is relatively great, the straight line distance, as indicated by the spot 29, may be assumed to be equal to the horizontal distance. As the ship bears down on the submarine, the spot 29 will fall behind the constant speed indicator 33 as shown in Fig. 3 by the position of the indicator and spot at 33a and 29a, respectively, since the straight line distance will not decrease as rapidly as the horizontal distance as the ship approaches more closely to the submarine. The constant speed indicator 33 is then an indication of the horizontal position of the ship with respect to a point on the surface above the submarine. No further changes in its speed are made during the attack, and it may therefore be used to predict the "over-the-target" position or to indicate any predetermined position with respect to the submarine to thereby indicate the proper point for dropping depth charges. It has been found that sufficient accuracy is obtained if the final adjustment is completed by the time the range has been reduced to approximately 1000 yards, although it will be understood that the earlier precise adjustment is accomplished, the more accurate the indication will be.

It will be noted that after the device has been adjusted the horizontal distance indicator 33 constantly measures the base $d$ (Fig. 1) of a right angle triangle, while indicator spot 29 constantly measures the hypotenuse which is the slant range $d'$. When two sides of a right angle triangle are known, the third side, which is the depth of the submarine below the surface, can readily be calculated. The submarine's depth may, therefore, be calculated from the data provided by indicators 29 and 33. It is also possible to indicate the depth directly in terms of the relative positions of the two indicators. However, since the actual depth depends not only on the relative distances $d$ and $d'$ but also on the absolute magnitude of at least one of them, it is necessary to provide a depth scale which will take this factor into account. This is accomplished by having the indicator 33 pick up a depth scale at, say, the 500 yard point on the range scale and carry the depth scale along with it to the zero scale position. At ranges in excess of 500 yards the depth of the submarine is not important, and also at extended ranges the depth determination would be relatively inaccurate. This is the reason for bringing the depth scale into operation at the 500 yard range point, for example.

The depth indicator is illustrated in Fig. 13, to which reference is now made. The depth scale 87 is povitally suspended at one end to the indicator 33, which in this instance is shown as being suspended below shaft 41 for convenience of illustration. The scale 87 consists of a translucent material, such as "Lucite" or the like, and its lower edge is curved so as to provide the necessary range compensation. The scale is brought into position when the lower edge engages a pin 89 which is positioned at approximately the 500-yard point on the scale, so that the depth scale 87 rides over the pin as the indicator 33 moves toward the zero scale position. The depth may then be read by noting the position of spot 29 with respect to the calibration lines on the scale 87. Since, as may be observed by reference to Fig. 3, for a given depth the difference between the straight line distance and the horizontal distance increases as the range decreases, the depth lines become more widely separated on the scale on the bottom portion thereof which is brought into play as the range decreases.

If it is desired to use a pulse range indicator having a circular scale, the constant speed indicator may be arranged as shown in Fig. 9. Scale 91 represents such a curved scale. It is equipped with a pulse echo range indicator 93 which cooperates with a range calibration 95. The constant speed pointer 97 is operated by the lateral movement of shaft 41 by means of gear teeth 99 on one surface of the shaft which cooperate with corresponding gear teeth 101 on segment 103. The segment is mounted for rotation about a common axis with and is connected to the constant speed indicator 97.

In order to transmit the information which may be obtained from the devices described above to the conning tower officer, so as to permit him to ascertain his position readily and to direct the progress of the attack, a remote indicator may be provided. A suggested embodiment is illustrated in Figs. 10 and 12 to which reference is now made. A ground glass or equivalent chart 105 is mounted in a position convenient to the observer and contains thereon a series of radial lines corresponding to bearing angles from zero to 360 degrees and a series of concentric circular lines corresponding to horizontal distance. The zero line preferably coincides with the fore and aft axis of a ship. The center of the chart represents the position of a ship and distance is therefore indicated outwardly from the center. Beneath this chart is located the remote indicator which consists of a horizontally positioned hydraulic cylinder 107, identical with cylinder 45 illustrated in Fig. 5, which is mounted for rotation in a horizontal plane. The shaft 109 carries with it light source 111 which projects an intense spot of light upwardly on to the lower surface of the ground glass chart 105 so that it may be observed from the top. The length of the shaft 109 is such that when fully extended the light spot reaches the edge of the chart and coincides with the center of the chart when the shaft is completely withdrawn within the cylinder. Horizontal rotation is accomplished by mounting the assembly on a rotatable support 113 which may be driven by a synchromotor 115. The hydraulic pipe lines leading to the cylinder 107 are brought out of the rotatable assembly to a fixed sleeve 117 in a manner illustrated in detail in Fig. 11. Within the sleeve there are two annular recesses opening into the respective fluid pipes 119 and 121 which are connected to the master unit. This permits freedom of rotation for the supporting member 113 without interfering with the flow of fluid into and from the system. Synchromotor 115 is energized by a synchronous generator 123 shown in Fig. 4, which is mechanically coupled to the transducer 7 and which transmits to the remote indicator currents uniquely defining the angular position of the transducer. Consequently, a spot of light will be observed on the scale 105, its angular position will indicate the bearing of the submarine with respect to the fore and aft line of the ship, and its radial position the horizontal distance from the ship to the submarine. With suitable intercept lines on the chart, the point of release of the depth charges may readily be ascertained by noting the time at which the spot of light crosses the intercept.

The relative speed dial reading serves to indicate to the conning officer the direction the target moves with respect to the attack ship. This information determines whether to lead or lag in the firing with respect to the center or zero of the chart. Therefore, if the target is moving toward the attack ship, the drop time is indicated when the spot indication coincides with the intercept circle drawn around the zero spot on the chart. If, however, the target is moving in the same direction as the attack ship, firing is accomplished when the spot passes through zero and then coincides with the opposite side of the intercept circle and for zero relative speed indication, the firing position would be at the center point.

The depth indication which may be observed by the operator at the master position may be transmitted to the control officer at the remote position by a simple voltmeter system. For convenience, a variable potentiometer may be connected across a source of constant D. C. potential and controlled by the control knob 39 mounted on dial 31. The voltage is transmitted to a voltmeter at the remote position, the indication of which may be calibrated in terms of depth. So also, if desired, the relative speed, as determined by the position of the relative speed control knob 37 with respect to its calibration, may be transmitted to the control officer at the remote point.

A system has thus been described for determining the horizontal position of a ship with respect to a submarine by initially determining the straight-line distance between the ship and the submarine for a period of time sufficient to establish the rate of decrease of the distance, utilizing this information to adjust the speed of movement of a constant speed indicator when the distance to the submarine is relatively great, and continuing at a constant rate the movement of this indicator to indicate the desired horizontal distance. The depth of the submarine is determined by the difference between the straight line distance of the ship from the submarine and the horizontal distance. A system has also been shown for transmitting this information to a remote point for the guidance of the control officer in directing the attack of the ship on the submarine.

What I claim is:

1. In a submarine attacking device for indicating the position of a ship with respect to a point on the surface of the water directly above said submarine; a calibrated scale; means including a first marker associated with said scale, for indicating the instantaneous straight line distance between said ship and said submarine; a second marker associated with said scale, motor means driving said second marker across said scale at a predetermined speed; the position and constant speed of said second marker being adjusted to coincide initially with the position and speed of said first marker, and a second calibrated scale for indicating the depth of said submarine as a function of the subsequent difference in position of said markers.

2. In a submarine attacking device for indicating the position of a ship with respect to a point on the surface of the water directly above the submarine, a scale calibrated in units of distance; means including a first marker associated with said scale for indicating the straight line distance between said ship and said submarine; a second marker associated with said scale, motor means moving said marker across said scale at a constant predeterminable speed; the position and speed of said second marker being adjusted to coincide initially with the position and speed of said first marker to cause said markers to move together when the distance to said submarine is relatively great; and a second scale pivotally mounted on said second marker calibrated in units of distance and extending into cooperative relation with said first marker for indicating the depth of said submarine.

3. A submarine attacking device comprising means on a ship for continuously determining the straight line distance between said ship and a submerged submarine toward which said ship is moving at a constant speed to determine the rate of change of said distance; a movable indicator and a scale calibrated in units of distance associated therewith; motor means adjusted to move said indicator at a rate proportional to the rate of change of said distance as determined at a time when the ratio of the straight line distance to the horizontal distance is substantially unity; the position of said movable indicator with respect to said scale being adjusted to a position indicative of the straight line distance at that time, said movement being continued at said rate as the distance is reduced and the ratio of straight line to horizontal distance becomes substantially greater than unity; the position of said indicator with respect to said scale then indicating the horizontal distance from said ship to said submarine.

4. A device of the character described in claim 3 in which said means for determining the straight line distance includes a visual marker associated with said scale.

5. A device of the character described in claim 3 in which said means for moving said indicator comprises a hydraulically driven piston.

6. In a submarine attacking device for a ship, which includes means for determining the straight line distance between said ship and a submarine and the rate of change of said distance, and means for determining the bearing of said submarine, the combination of a chart marked with radial lines corresponding to angular bearing and concentric circular lines corresponding to the horizontal distance of said submarine from the ship as a center; an indicator for said chart, means responsive to said bearing determinining means for adjusting the relative angular position of said chart and said indicator to cause the angular position of said indicator to correspond to the bearing of said submarine, means for moving said indicator radially across said chart, means for adjusting the radial position of said indicator to correspond to the initial horizontal distance between said ship and said submarine, and means for adjusting the speed of radial movement of said indicator to correspond to the rate of change of said straight line distance.

7. In a submarine attacking device for a ship which includes means for determining the straight line distance between said ship and a submarine and the rate of change of said distance, and means for determining the bearing of said submarine, the combination of a chart marked with radial lines corresponding to angular bearing and concentric circular lines corresponding to the distance of said submarine from the ship as a center; an indicator for said chart, means responsive to said bearing determining means for adjusting the relative position of said chart and said indicator to indicate the bearing of said submarine, means for moving said indicator radially across said chart at a normally constant speed, means for adjusting the radial position of said indicator to correspond to the initial straight line distance between said ship and said submarine, and means for adjusting the speed of radial movement of said indicator to correspond to the initial rate of change of said straight line distance when said distance is relatively great.

HORACE R. DYSON.

REFERENCES CITED

The following references are of record in the file of this patent:

UNITED STATES PATENTS

| Number | Name | Date |
|---|---|---|
| 1,151,295 | Sawyer | Aug. 24, 1915 |
| 1,782,294 | Florisson | Nov. 18, 1930 |
| 2,066,498 | Watson | Jan. 5, 1937 |
| 2,355,502 | Barton | Aug. 8, 1944 |
| 2,389,861 | Macomber | Nov. 17, 1945 |